(12) United States Patent  
Czachor (10) Patent No.: US 6,612,807 B2
(45) Date of Patent: Sep. 2, 2003

(54) FRAME HUB HEATING SYSTEM (75) Inventor: Robert Paul Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 21 days.

(21) Appl. No.: 09/999,273

(22) Filed: Nov. 15, 2001

(65) Prior Publication Data

US 2003/0123974 A1 Jul. 3, 2003

(51) Int. Cl.$^7$ .............................................. F01D 25/10
(52) U.S. Cl. ........................ 415/116; 415/142; 415/176
(58) Field of Search ................................ 415/116, 136, 415/137, 138, 142, 175, 176, 178; 60/796, 39.5

(56) References Cited

U.S. PATENT DOCUMENTS

| | | | | |
|---|---|---|---|---|
| 2,166,823 A | * | 7/1939 | Rosenocher | ............ 415/115 X |
| 3,910,375 A | | 10/1975 | Hache et al. | ............... 181/215 |
| 4,815,281 A | | 3/1989 | Gely | .......................... 60/226.1 |
| 5,020,318 A | | 6/1991 | Vdoviak | ..................... 60/226.1 |
| 5,269,135 A | | 12/1993 | Vermejan et al. | ........... 60/226.1 |
| 5,528,904 A | * | 6/1996 | Jones et al. | .................... 60/753 |
| 5,545,004 A | * | 8/1996 | Ho et al. | ................. 415/116 X |
| 5,597,286 A | | 1/1997 | Dawson et al. | ............. 415/115 |
| 6,058,696 A | | 5/2000 | Nikkanen et al. | .......... 60/226.1 |
| 6,106,229 A | | 8/2000 | Nikkanen et al. | ........... 415/179 |
| 6,511,284 B2 | * | 1/2003 | Darnell et al. | .......... 415/176 X |

* cited by examiner

*Primary Examiner*—Edward K. Look
*Assistant Examiner*—Richard A. Edgar
(74) *Attorney, Agent, or Firm*—Pierce Atwood; Nathan D Herkamp (57) ABSTRACT

A frame for a gas turbine engine is provided comprising a central hub having a circumferentially extending flowpath surface enclosing an interior cavity and an annular outer casing connected to the hub by a plurality of struts extending radially from the hub to the casing, wherein the flowpath surface has a plurality of inlets disposed in flow communication with the interior cavity and a plurality of outlets disposed in flow communication with the interior cavity. A flowpath member for a turbine frame hub is also provided having a plurality of inlets and outlets formed therein.

25 Claims, 7 Drawing Sheets

FRAME HUB HEATING SYSTEM

BACKGROUND OF THE INVENTION

This invention relates generally to gas turbines, engines and more particularly to an apparatus for heating the hub of a frame of a gas turbine engine.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan.

The rotating components of a gas turbine engine are supported by bearings mounted in one or more structural frames. The frames typically take the form of an inner hub connected to a outer casing by an array of radially extending airfoil-shaped struts. Typical turbofan engines have a fan frame just aft of the fan rotor and a turbine rear frame aft of the low pressure turbine. Turbine rear frames share a common problem in the presence of hub-to-case transient and steady-state thermal gradients which can develop because the hub region is typically more massive than the casing, coupled with the fact that the case is typically 100% exposed to the hot flowpath gases while only one of 3 or 4 hub walls is similarly exposed. This results in a much more rapid transient response of the casing relative to the hub, resulting in potentially destructive thermal stresses in the turbine frame. It is known to alleviate these stresses by heating the hub of a turbine frame, therefore reducing the thermal gradients. However, known systems for heating turbine frame hubs typically require modification to the turbine frame and the addition of extra components, which increases the cost and complexity of the turbine frame design.

Accordingly, there is a need for a simple and economical method of heating turbine frame hubs.

BRIEF SUMMARY OF THE INVENTION

The above-mentioned need is met by the present invention, which in one aspect provides a frame for a gas turbine engine comprising a central hub having a circumferentially extending flowpath surface enclosing an interior cavity and an annular outer casing connected to the hub by a plurality of struts extending radially from the hub to the casing, wherein the flowpath surface has a plurality of inlets disposed in the in flow communication with the interior cavity and a plurality of outlets disposed in flow communication with the interior cavity. In another aspect, the invention provides a flowpath member for a turbine frame hub having a plurality of inlets and outlets formed therein.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
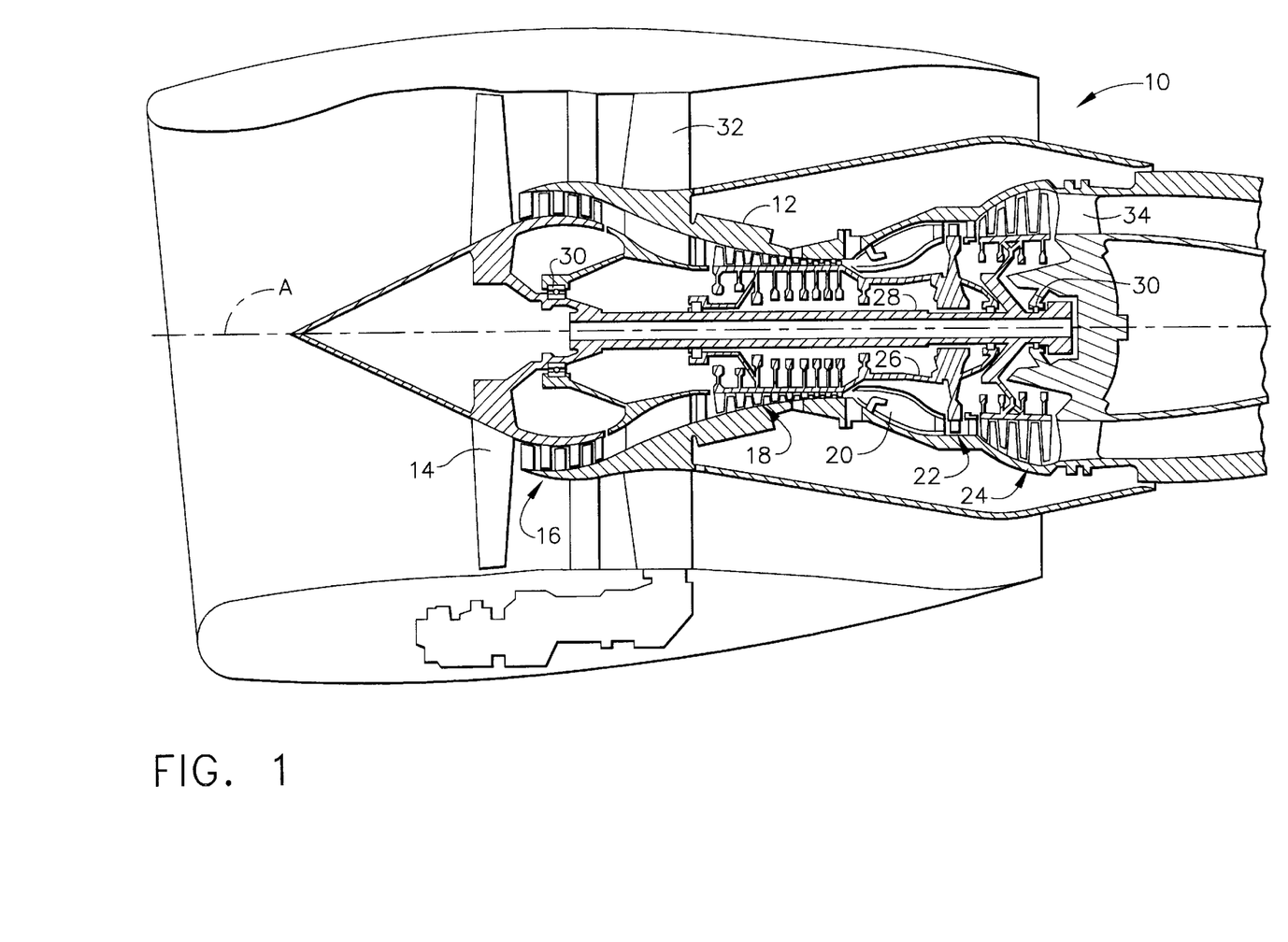
FIG. 1 is a cross-sectional view of an exemplary gas turbine engine.

Referring to the drawings wherein identical reference numerals denote the same elements throughout the various views, FIG. 1 illustrates a representative gas turbine engine, generally designated 10. The engine 10 has a longitudinal center line or axis A and an outer stationary annular casing 12 disposed concentrically about and coaxially along the axis A. The engine 10 has a fan 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into a low pressure turbine 24, which drives the fan 14 and booster 16 via an inner shaft 28. The fan 14 provides the majority of the thrust produced by the engine 10, while the booster 16 is used to supercharge the air entering the compressor 18. The inner and outer shafts 28 and 26 are rotatably mounted in bearings 30 which are themselves mounted in one or more structural frames 32 and 34. The aft frame 34 is referred to as a turbine rear frame. Some engines may also incorporate a turbine center frame (not shown) of similar construction located between the high pressure turbine 22 and the low pressure turbine 24.

Figure 2:
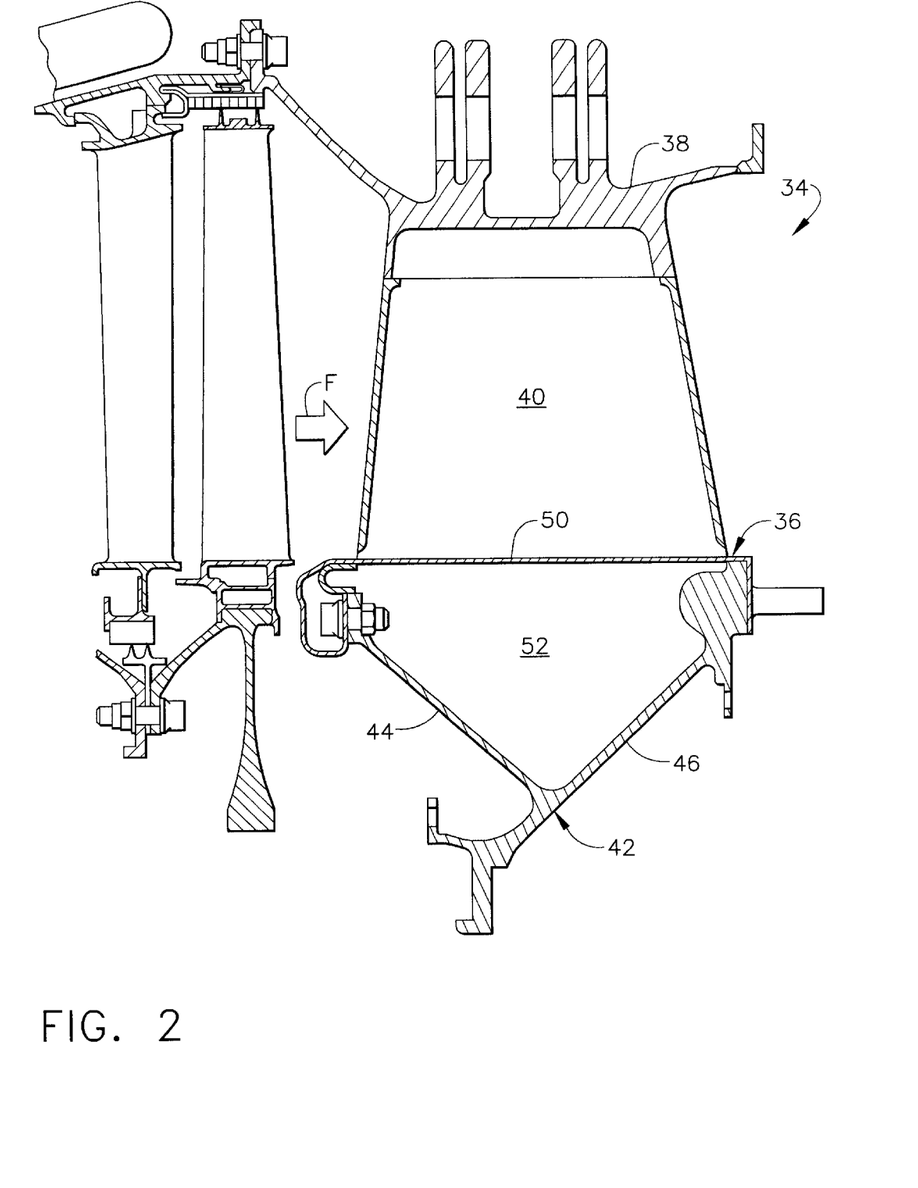
FIG. 2 is a cross-sectional view of a portion of the engine of FIG. 1 illustrating a turbine frame in greater detail.

Referring to FIG. 2, the turbine rear frame 34 has a central hub 36 connected to an outer casing 38 by a plurality of radially extending struts 40 which extend across the flowpath of the hot combustion gases. The turbine rear frame 34 may be constructed of a single casting including the hub 36, casing 38, and struts 40, or it may be built up from individual components. The hub 36 comprises an inner structural portion 42 having first and second annular walls 44 and 46.

A non-structural annular flowpath member 50 surrounds the inner structural portion 42 and forms the inner boundary of the combustion gas flowpath. Together the annular walls 44 and 46 of the inner structural portion 42 define an annular interior cavity 52. The interior cavity 52 may be divided by the radially inner portion of the struts 40 into a plurality of individual spaces. Other turbine frame designs may have a different configuration of the hub structural portion 42 or the flowpath member 50; for example, the flowpath member 50 may be an integral part of the hub 36 and may be a structural member. The present invention is applicable to any frame hub having an interior cavity 52 and a surface exposed to a hot gas flowpath.

The present invention provides for heating of the interior cavity 52 of by the incorporation of a plurality of inlets and outlets disposed in the flowpath member 50 in fluid communication with the interior cavity 52. A portion of the hot combustion gases are directed into the interior cavity 52 through the inlets. The air flows through the interior cavity 52, heating the inner structural portion 42, and then exits the interior cavity 52 through the outlets and rejoins the flowpath. The inlets and outlets may be disposed in one or more annular arrays around the periphery of the flowpath member 50.

Figure 3:
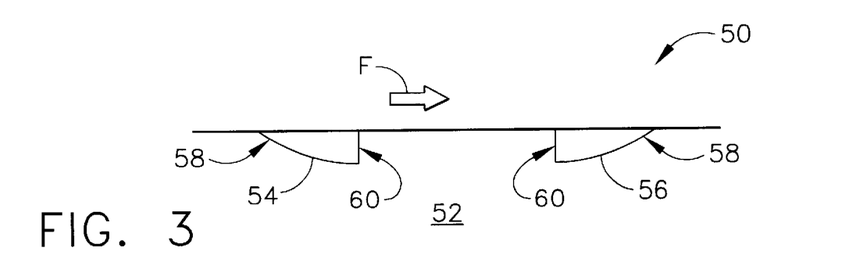
FIG. 3 is a schematic cross-sectional view of a flowpath member constructed in accordance with a first configuration of the present invention.

In one configuration, as seen in FIG. 3, a plurality of inlets 54 in the shape of radially inwardly extending scoops are formed in an upstream portion of the flowpath member 50. The inlets 54 have a sloped upstream end 58 and an opening 60 facing in the downstream direction. A plurality of outlets 56 in the shape of radially inwardly extending scoops are formed in the downstream portion of the flowpath member 50. The outlets 56 have a sloped downstream end 58 and an opening 60 facing the upstream direction. It is noted that, as used herein, the term "scoop" refers to a structure protruding from the surface of the flowpath member 50. Any particular one of the scoops may be classified as an inlet 54 or an outlet 56 depending upon both whether it protrudes radially inwardly or outwardly from the flowpath member 50 with respect to the longitudinal axis A of the engine 10 and its alignment with respect to the direction of flow past the scoop. Furthermore, the terms "upstream" and "downstream" refer to a direction of flow or a location of a structure with respect to the direction of flow of the combustion gases through the engine 10, shown in the Figures by the arrow labeled F.

Figure 4:
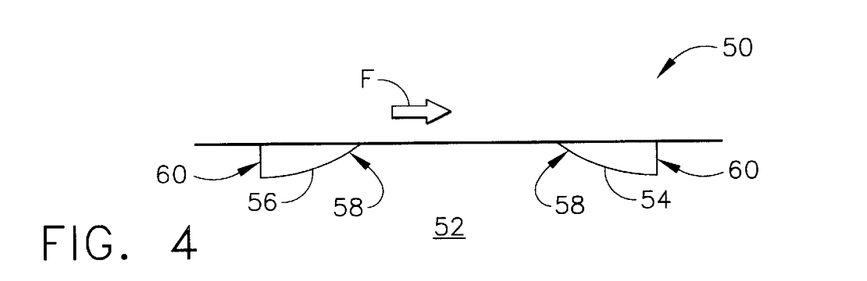
FIG. 4 is a schematic cross-sectional view of a flowpath member constructed in accordance with a second configuration of the present invention.

In a second configuration, seen in FIG. 4, the inlets 54 are positioned in a downstream portion of the flowpath member 50 and the outlets 56 are positioned in an upstream portion of the flowpath member 50. The inlets 54 have a sloped upstream end 58 and an opening 60 facing in the downstream direction, and the outlets 56 have a sloped downstream end 58 and an opening 60 facing the upstream direction. This arrangement may have an advantage in certain applications, as described below.

Figure 5:
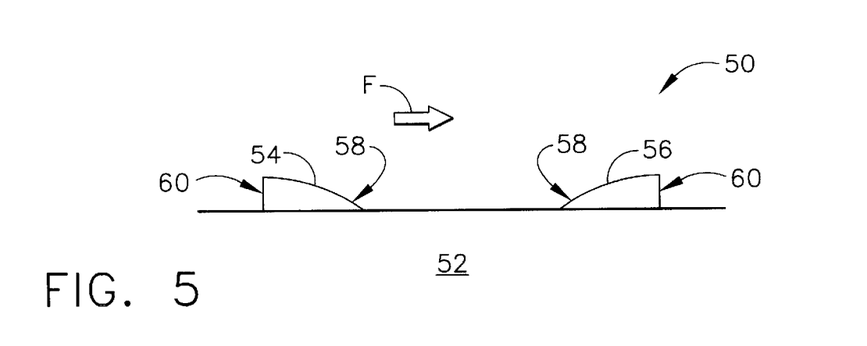
FIG. 5 is a schematic cross-sectional view of a flowpath member constructed in accordance with a third configuration of the present invention.
Figure 6:
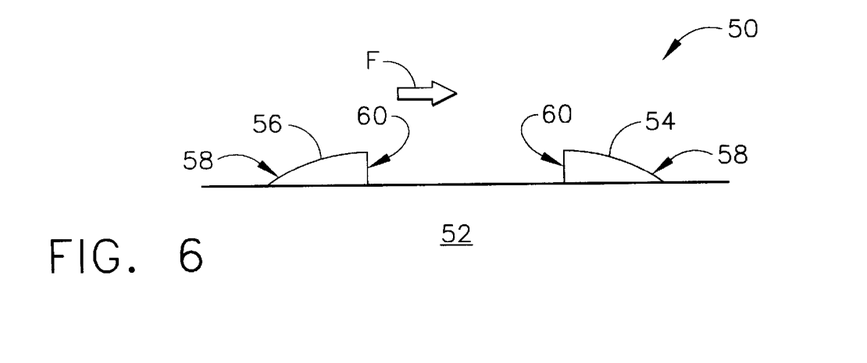
FIG. 6 is a schematic cross-sectional view of a flowpath member constructed in accordance with a fourth configuration of the present invention.

In a third configuration, shown in FIG. 5, a plurality of inlets 54 in the shape of radially outwardly extending scoops are formed in an upstream portion of the flowpath member 50. The inlets have a sloped downstream end 58 and an opening 60 facing in the upstream direction. A plurality of outlets 56 in the shape of radially outwardly extending scoops are formed in the downstream portion of the flowpath member 50. The outlets 56 have a sloped upstream end 58 and an opening 60 facing in the downstream direction. In a fourth configuration, illustrated in FIG. 6, the inlets 54 are positioned in a downstream portion of the flowpath member 50 and the outlets 56 are positioned in an upstream portion of the flowpath member 50. The inlets 54 have a sloped downstream end 58 and an opening 60 facing in the upstream direction, and the outlets 56 have a sloped upstream end 58 and an opening 60 facing in the downstream direction. The last two configurations described above having radially outwardly extending scoops provide more effective air capture and exhaust relative to the configurations having radially inwardly extending scoops, at the price of creating greater aerodynamic losses in the flowpath gasses.

In operation, a portion of the hot flowpath gases are diverted and forced through the hub's interior cavity 52 by the pressure gradient in the downstream direction. In each case, the inlets 54 are shaped so as to be exposed to the total pressure of the combustion gas flow, while the outlets 56 are exposed only to the reduced static pressure caused by the velocity of the flowpath gases. This drives the airflow from the inlet 54, through the interior cavity 52, and to the outlet 56. While in the interior cavity 52 the hot gases heat the structural portion 42 of the hub 36, reducing the temperature gradient between the hub 36 and the outer ring 38, which lowers the stresses between the two components.

The scoops can be varied to suit a particular application. Their number, shape, size, and location can be modified to improve desired qualities, such as cost, producibilty, or performance. In some cases, the combustion gases may be subject to mixing with a flow of relatively low-temperature air introduced into the combustion gas flowpath, which reduces the temperature locally at the upstream end of the hub 36. For example, turbine cavity purge air may escape from the aft end of the low pressure turbine (LPT) 24 into the hot gas flowpath. In this case, there would be a particular advantage to placing the inlets 54 as far aft as possible at the downstream end of the flowpath member 50, as they may extract better mixed (and therefore hotter) air, thus improving the heating of the interior cavity 52.

Figure 7:
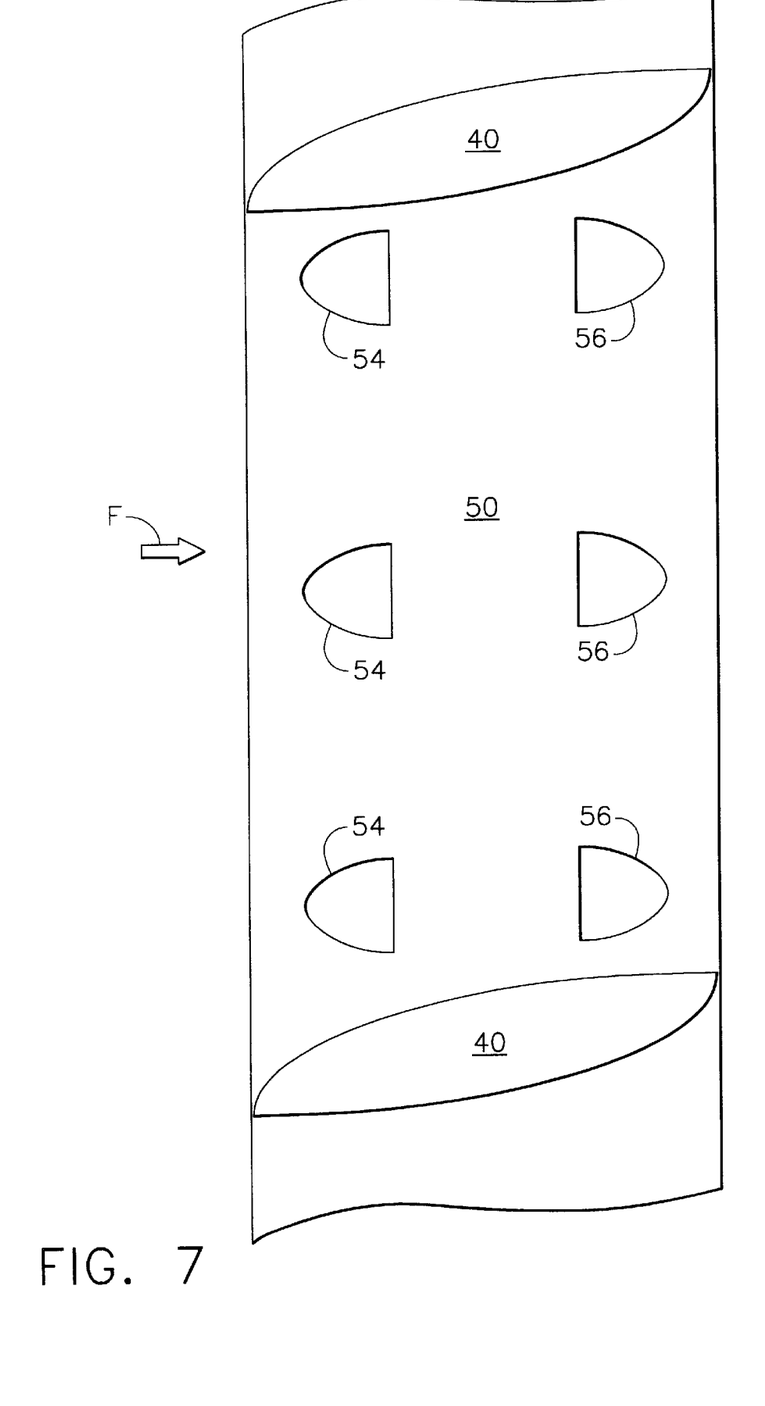
FIG. 7 is a view looking radially inward of a portion of a flowpath member showing a first arrangement of the scoops.
Figure 8:
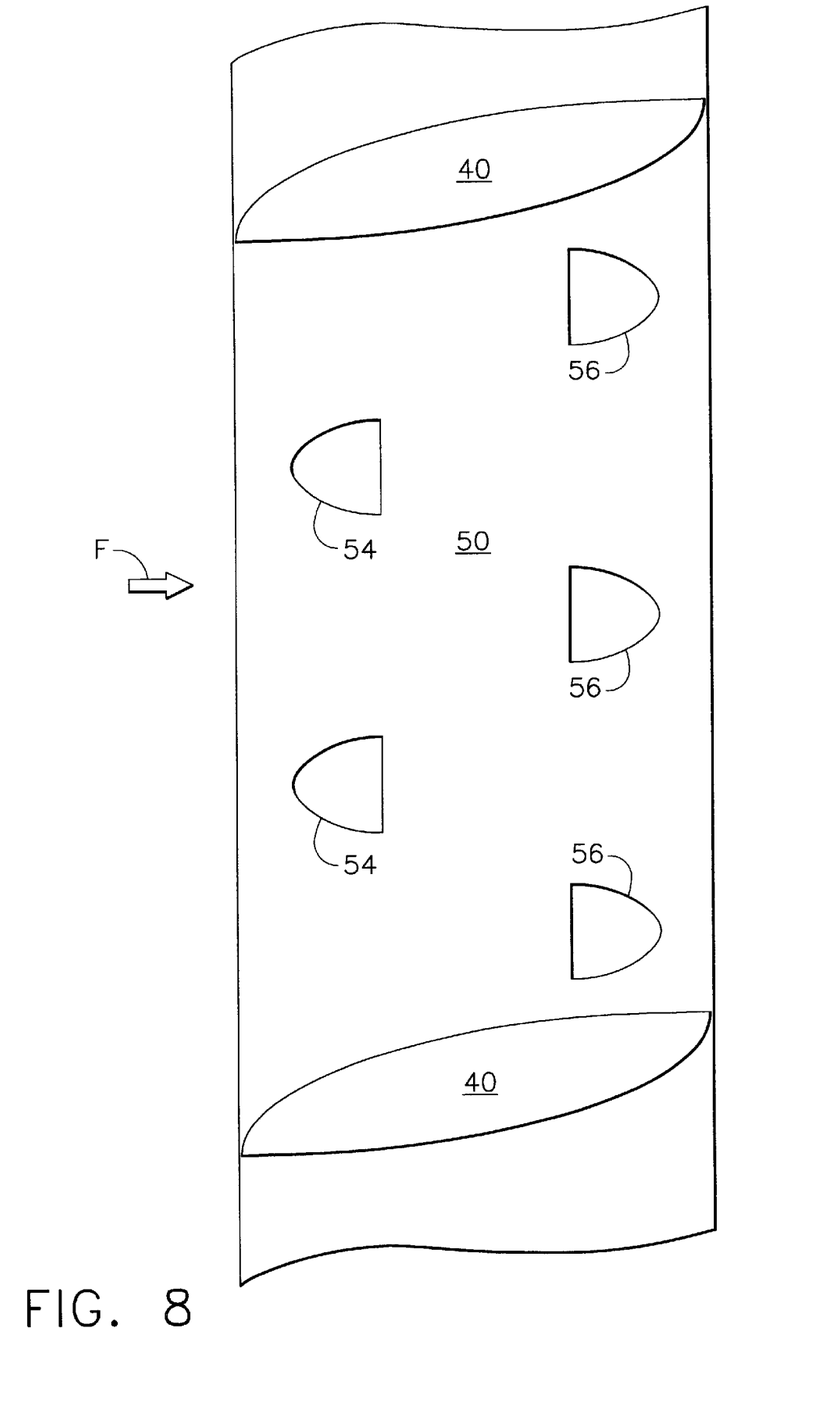
FIG. 8 is a view looking radially inward of a portion of a flowpath member showing a second arrangement of the scoops.
Figure 9:
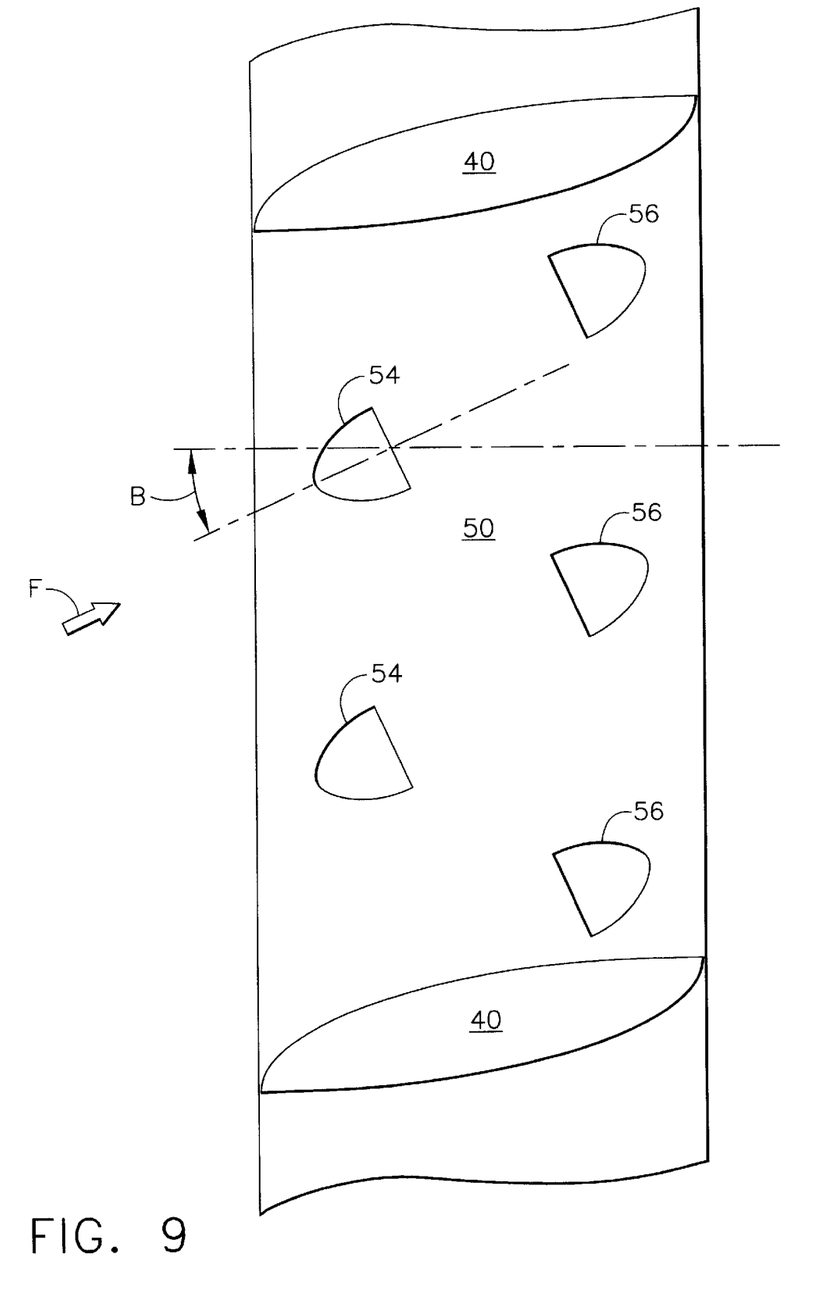
FIG. 9 is a view looking radially inward of a portion of a flowpath member showing a third arrangement of the scoops.

The inlets 54 and outlets 56 may be axially aligned as shown in FIG. 7. If desired they may also be offset in a circumferential direction as shown in FIG. 8 in order to force circulation of the flowpath gases in a circumferential direction as well as the axial direction. Also, in cases where the flowpath gases have a tangential velocity component, the inlets 54 and outlets 56 may be oriented at an acute angle "B" with respect to the axial direction, as shown in FIG. 9, in order to better capture and exhaust the flow. Furthermore, the two types of scoops described above could also be mixed to suit a particular application. For example, radially outwardly extending inlets 54 could be used with radially inwardly extending outlets 56.

Figure 10:
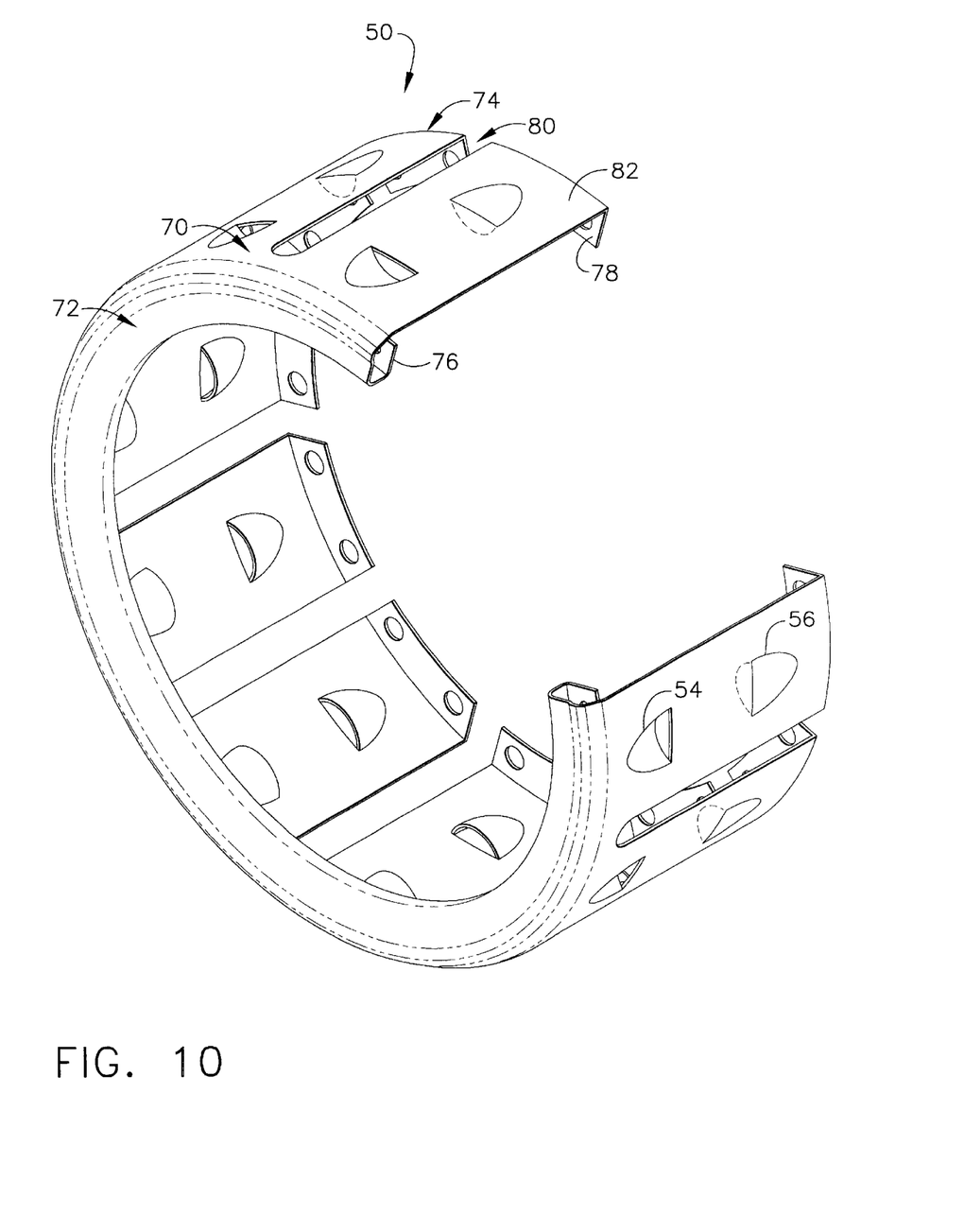
FIG. 10 is a perspective view of an exemplary flowpath member having a portion thereof removed for illustration purposes.

An exemplary flowpath member 50 is illustrated in more detail in FIG. 10. The illustrated flowpath member 50 has a generally cylindrical wall 70. The wall 70 has an first end 72 and a second end 74. Generally radially inwardly extending forward and aft flanges 76 and 78 are disposed at the first and second ends 72 and 74 of the wall 70 respectively. A plurality of axially-extending slots 80 are formed in the wall 70. The slots 80 originate at the second end 74 and extend a portion of the wall's length, dividing the wall 70 into a plurality of axially extending arcuate segments 82. The slots 80 fit around the bases of the turbine rear frame struts 40 when the flowpath member 50 is installed on the hub 36. The flowpath member 50 is non-structural and may be formed from sheet metal. The inlets 54 and outlets 56 may be formed in the wall 70 by any known manner, including for example a punching operation. The flowpath member 50 illustrated may be used to replace an existing member that does not have inlets 54 and outlets 56.

The foregoing has described a frame for a gas turbine engine comprising a central hub having a circumferentially extending flowpath surface enclosing an interior cavity and an annular outer casing connected to the hub by a plurality of struts extending radially from the hub to the casing, wherein the flowpath surface has a plurality of inlets disposed in the in flow communication with the interior cavity and a plurality of outlets disposed in flow communication with the interior cavity. The foregoing has also described a flowpath member for a turbine frame hub having a plurality of inlets and outlets formed therein. While specific embodiments of the present invention have been described, it will be apparent to those skilled in the art that various modifications thereto can be made without departing from the spirit and scope of the invention as defined in the appended claims.

What is claimed is:

1. A flowpath member for a gas turbine engine, comprising a generally cylindrical wall formed from sheet metal having an upstream end and a downstream end, wherein a plurality of inlets and a plurality of outlets are formed in said wall, wherein said inlets comprise an annular array of radially inwardly extending scoops formed in said flowpath surface, each of said scoops having an opening facing in a downstream direction, and wherein said outlets comprise an annular array of radially inwardly extending scoops formed in said flowpath surface, each of said scoops having an opening facing in an upstream direction.

2. The flowpath member of claim 1 wherein said array of inlets is disposed upstream of said array of outlets.

3. The flowpath member of claim 1 wherein said array of inlets is disposed downstream of said array of outlets.

4. The flowpath member of claim 1 wherein each of said inlets are axially aligned with a respective one of said outlets.

5. The flowpath member of claim 1 wherein each of said inlets are offset from a respective one of said outlets in a circumferential direction.

6. The flowpath member of claim 1 wherein said inlets and outlets are oriented at an acute angle in a circumferential direction with respect a longitudinal axis of said engine.

7. The flowpath member of claim 1 wherein a plurality of axially extending slots are disposed in said wall, said slots having a first end disposed at a first end of said wall and a second end disposed near a second end of said wall, whereby a portion of said wall is divided into a plurality of axially extending arcuate segments.

8. A flowpath member for a gas turbine engine, comprising a generally cylindrical wall formed from sheet metal having an upstream end and a downstream end, wherein a plurality of inlets and a plurality of outlets are formed in said wall, wherein said inlets comprise an annular array of radially outwardly extending scoops formed in said wall, each of said scoops having an opening facing in an upstream direction, and wherein said outlets comprise an annular array of radially outwardly extending scoops formed in said wall, each of said scoops having an opening facing in a downstream direction.

9. The flowpath member of claim 8 wherein said array of inlets is disposed upstream of said array of outlets.

10. The flowpath member of claim 8 wherein said array of inlets is disposed downstream of said array of outlets.

11. The flowpath member of claim 8 wherein each of said inlets are axially aligned with a respective one of said outlets.

12. The flowpath member of claim 8 wherein each of said inlets are offset from a respective one of said outlets in a circumferential direction.

13. The flowpath member of claim 8 wherein said inlets and outlets are oriented at an acute angle in a circumferential direction with respect a longitudinal axis of said engine.

14. The flowpath member of claim 8 wherein a plurality of axially extending slots are disposed in said wall, said slots having a first end disposed at a first end of said wall and a second end disposed near a second end of said wall, whereby a portion of said wall is divided into a plurality of axially extending arcuate segments.

15. A frame for a gas turbine engine, comprising:
a central hub having a circumferentially extending flowpath surface enclosing an interior cavity,
an annular outer casing,
a plurality of struts extending radially from said hub to said casing,
a plurality of inlets disposed in said flowpath surface in flow communication with said interior cavity; and
a plurality of outlets disposed in said flowpath surface in flow communication with said interior cavity.

16. The frame of claim 15 wherein said flowpath surface is defined by a sheet metal member.

17. The frame of claim 15 wherein each of said inlets are axially aligned with one of said outlets.

18. The frame of claim 15 wherein each of said inlets are offset from one of said outlets in a circumferential direction.

19. The frame of claim 15 wherein said inlets and outlets are oriented at an acute angle in a circumferential direction with respect a longitudinal axis of said engine.

20. The frame of claim 15 wherein said inlets comprise an annular array of radially inwardly extending scoops formed in said flowpath surface, each of said scoops having an opening facing in a downstream direction, and wherein said outlets comprise an annular array of radially inwardly extending scoops formed in said flowpath surface, each of said scoops having an opening facing in an upstream direction.

21. The frame of claim 20 wherein said inlets are disposed upstream of said outlets.

22. The frame of claim 20 wherein said inlets are disposed downstream of said outlets.

23. The frame of claim 15 wherein said inlets comprise an annular array of radially outwardly extending scoops formed in said flowpath surface, each of said scoops having an opening facing in an upstream direction, and wherein said outlets comprise an annular array of radially outwardly extending scoops formed in said flowpath surface, each of said scoops having an opening facing in a downstream direction.

24. The frame of claim 23 wherein said inlets are disposed upstream of said outlets.

25. The frame of claim 23 wherein said inlets are disposed downstream of said outlets.

* * * * *